United States Patent
Turner et al.

(10) Patent No.: US 6,747,650 B2
(45) Date of Patent: Jun. 8, 2004

(54) ANIMATION TECHNIQUES TO VISUALIZE DATA

(75) Inventors: Alan E. Turner, Herndon, VA (US); Lucille T. Nowell, Richland, WA (US)

(73) Assignee: Battelle Memorial Institute, Columbus, OH (US)

( * ) Notice: Subject to any disclaimer, the term of this patent is extended or adjusted under 35 U.S.C. 154(b) by 256 days.

(21) Appl. No.: 10/127,778

(22) Filed: Apr. 22, 2002

(65) Prior Publication Data

US 2003/0197702 A1 Oct. 23, 2003

(51) Int. Cl.$^7$ ............................................. G06T 13/00
(52) U.S. Cl. ...................................... 345/473; 345/440
(58) Field of Search .............................. 345/473, 418, 345/419, 427, 629, 619, 474, 440

(56) References Cited

U.S. PATENT DOCUMENTS

| | | | |
|---|---|---|---|
| 5,671,381 A | | 9/1977 | Strasnick et al. |
| 5,261,041 A | | 11/1993 | Susman |
| 5,268,998 A | * | 12/1993 | Simpson ..................... 345/427 |
| 5,412,765 A | | 5/1995 | Yamrom et al. |
| 5,555,354 A | | 9/1996 | Strasnick et al. |
| 5,710,899 A | | 1/1998 | Eick |
| 5,818,462 A | | 10/1998 | Marks et al. |
| 6,021,215 A | | 2/2000 | Kornblit et al. |
| 6,034,697 A | | 3/2000 | Becker |
| RE36,840 E | | 8/2000 | Mihalisin et al. |
| 6,188,403 B1 | | 2/2001 | Sacerdoti et al. |
| 6,256,649 B1 | | 7/2001 | Mackinlay et al. |
| 6,373,489 B1 | * | 4/2002 | Lu et al. ..................... 345/428 |
| 2002/0199156 A1 | * | 12/2002 | Chess et al. .................... 716/1 |

OTHER PUBLICATIONS

Eser Kandogan, "Star Coordinates: A Multi–dimensional Visualization Technique with Uniform Treatment of Dimensions", IBM Almaden Research Center, California (date unknown).

Chris L. Bentley, Matthew O. Ward, "Animating Multidimensional Scaling to Visualize N–Dimensional Data Sets", IEEE Symposium on Information Visualization, Worcester, MA, 1996.

Ed Huai–hsin Chi, John Riedl, Elizabeth Shoop, John V. Carlis, Ernest Retzel, Phillip Barry, "Flexible Information Visualization of Multivariate Data from Biological Sequence Similarity Searches", IEEE, Minnesota, 1996.

Patrick Hoffman, Georges Grinstein, Kenneth Marx, Ivo Grosse, Eugene Stanley, "DNA Visual and Analytic Data Mining", Massachusetts, IEEE, 1997.

Website Publication, SPIRE, at URL www.pnl.gov/infoviz/spire, dated at least as early as Mar. 11, 2001.

Patrick Hoffman, Georges Grinstein, David Pinkney, "Dimensional Anchors: A Graphic Primitive for Multidimensional Multivariate Information Visualizations", Institute for Visualization and Perception Research, Massachusetts, 2000.

* cited by examiner

Primary Examiner—Mark Zimmerman
Assistant Examiner—Huedung X. Cao
(74) Attorney, Agent, or Firm—Woodard, Emhardt, Moriarty, McNett & Henry LLP

(57) ABSTRACT

One embodiment of the present invention includes displaying a first object and a second object with a computer system. The first object represents data corresponding to a first combination of a number of variables and a second object represents data corresponding to a second combination of the variables. The first object is moved in a first pattern and the second object is moved in a second pattern during this display with the computer system. These patterns include a common characteristic to represent one of the variables common to the first and second combinations and a varying characteristic indicative of variation of the one of the variables.

40 Claims, 17 Drawing Sheets

ANIMATION TECHNIQUES TO VISUALIZE DATA

BACKGROUND

The present invention relates to data processing techniques and more particularly, but not exclusively, relates to the visualization of data using animation.

Recent technological advancements have led to the collection of vast amounts of electronic data. In some instances, this data may be defined in terms of several different dimensions. While computer visualization techniques are generally limited to the display of no more than three dimensions of data at a time, the use of color, data point shape, and various other graphical encoding schemes can, under certain conditions, represent more than three dimensions.

Unfortunately, the ability to quickly identify patterns or relationships which exist within groups of data, and/or the ability to readily perceive the underlying high-dimensional data remains limited. Thus, there is an ongoing need for further contributions in this area of technology.

SUMMARY OF THE INVENTION

One embodiment of the present invention is a unique data processing technique. Other embodiments include unique apparatus, systems, and methods for visualizing data.

A further embodiment of the present invention includes providing a display with a computer system that has several data visualization objects each representative of data presented relative to a number of variables. A group of the data visualization objects are animated as a function of one of the variables. This animated group can further include a characteristic that varies in correspondence to the value of the variable for each group object.

Still a further embodiment includes displaying a first object representing data corresponding to a first combination of variables and a second object representing data corresponding to a second combination of the variables with animation. The animation includes a first animation characteristic that is generally the same for both the first object and the second object to visually group both objects together, and a second animation characteristic that varies with the value of the one of the variables to visualize variation of the one of the objects between the first and second objects.

Yet another embodiment of the present invention includes processing data with a computer system and displaying a number of objects to represent the data relative to a number of variables. A set of the objects are animated that correspond to one of the variables by moving each set member along a respective one of a number of linear paths. These paths can be in the form of one or more loops, be at least partially curvilinear, and/or be at least partially rectilinear.

Still another embodiment of the present invention includes: establishing a visualization of data with a computer system that represents the data relative to a number of variables and includes a number of data objects each representing a relationship to one of the variables; moving each of the objects relative to a respective one of a number of visualization locations; and providing a number of animated indicators each relating a respective one of the objects to the respective one of the visualization locations.

Another embodiment of the present invention includes a processor to generate an output corresponding to a data visualization. This visualization represents data relative to a number of data dimensions. The output includes a number of animation signals corresponding to a set of objects in the visualization that each have one of the data dimensions in common and each correspond to a respective one of a number of object animation patterns defined by the animation signals. The objects of the visualization are each animated in accordance with the respective one of the object animation patterns with a first characteristic to indicate membership of the objects in a group and a second characteristic to indicate variation of the one of the data dimensions among members of the group.

A further embodiment includes a computer-accessible device carrying logic operable to display a first object and a second object with a computer system. The first object represents data corresponding to a first combination of a number of data dimensions and the second object represents data corresponding to a second combination of the data dimensions. The logic is further operable to move the first object in a first pattern and the second object in a second pattern while being displayed. The first pattern and the second pattern each include a common characteristic to represent one or more of the data dimensions common to the first combination and the second combination and a variable characteristic indicative of a varying level of the one or more data dimensions. This device can be in the form of a removable memory with the logic being in the form of a number of programming instructions stored in the memory. Alternatively or additionally, this device can include a transmission medium of a computer network that carries the logic in the form of one or more signals.

In another embodiment, a number of visualization objects for display with a computer system are established to represent data relative to a number of variables. A first animation pattern is selected to represent a first one of the variables and a second animation pattern is selected to represent a second one of the variables. One or more of the objects are animated with a combination of the first animation pattern and the second animation pattern to visually represent a relationship of the one or more objects to the first one of the variables and the second one of the variables.

Still another embodiment includes: displaying several data visualization objects with a computer system to represent data relative to a number of variables; animating a group of the data visualization objects that each have a relationship to one of the variables in common and are each animated with a first animation characteristic to visualize membership in the group; and visualizing variation of the one of the variables by providing a second animation characteristic for each respective object in the group that varies with the one of the variables for the respective object.

Accordingly, one object of the present invention is to provide a unique data processing technique.

Another object is to provide a unique apparatus, system, device, or method for visualizing data.

Further objects, embodiments, forms, features, aspects, benefits, and advantages of the present invention will become apparent from the drawings and detailed description contained herein.

DETAILED DESCRIPTION OF SELECTED EMBODIMENTS

Figure 1:
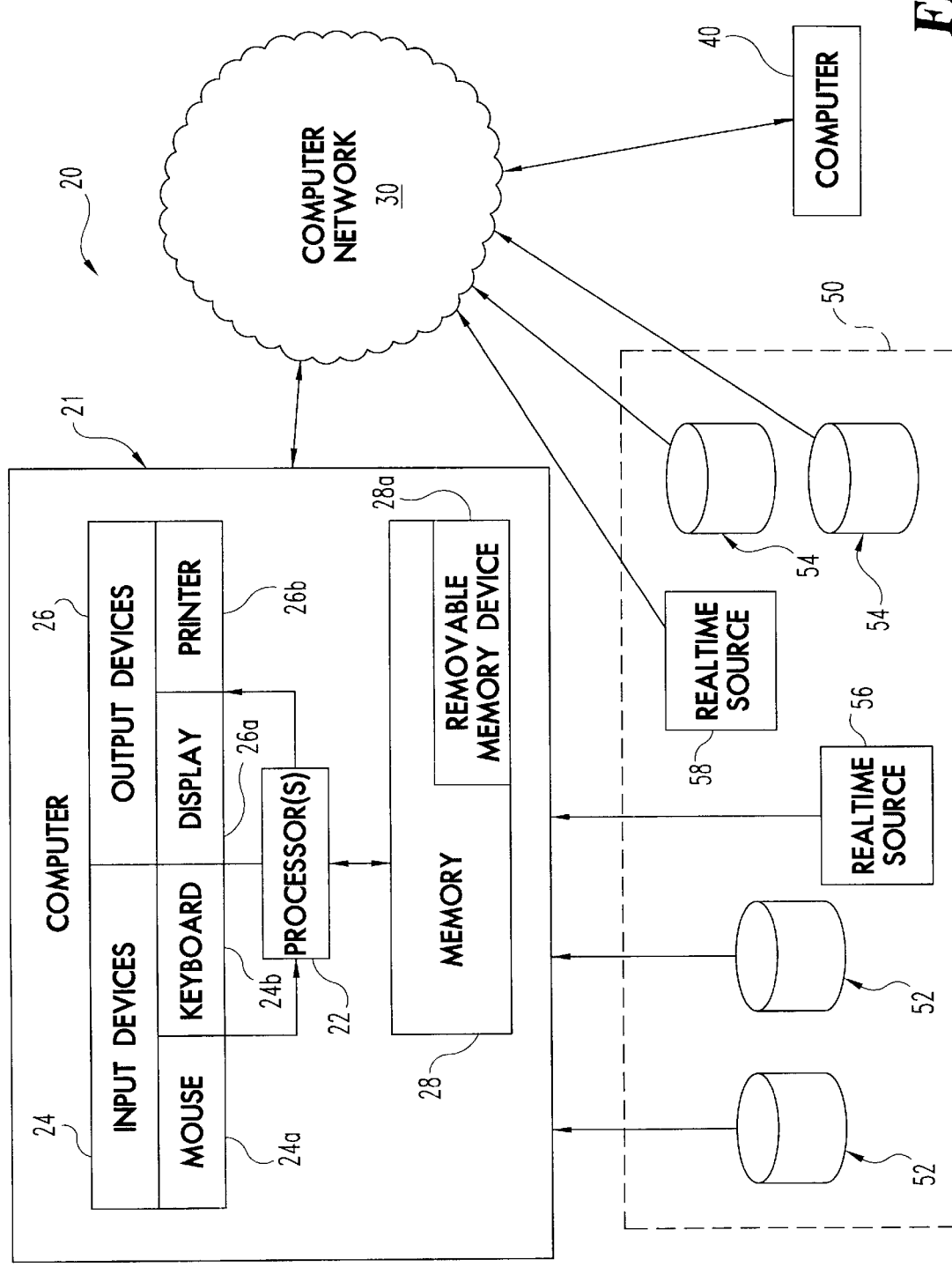
FIG. 1 is a diagrammatic view of a computing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 diagrammatically depicts computer system 20 of one embodiment of the present invention. System 20 includes computer 21 with one or more computer processor(s) 22. Processor(s) 22 can be of any type. System 20 also includes operator input devices 24 and operator output devices 26 operatively coupled to processor(s) 22. Input devices 24 include a conventional mouse 24a and keyboard 24b, and alternatively or additionally can include a trackball, light pen, voice recognition subsystem, and/or different input device type as would occur to those skilled in the art. Output devices 26 include a conventional graphic display 26a, such as a color or noncolor plasma, Cathode Ray Tube (CRT), or Liquid Crystal Display (LCD) type, and color or noncolor printer 26b. Alternatively or additionally output devices 26 can include an aural output system and/or different output device type as would occur to those skilled in the art. Further, in other embodiments, more or fewer operator input devices 24 or operator output devices 26 may be utilized.

System 20 also includes memory 28 operatively coupled to processor(s) 22. Memory 28 can be of one or more types, such as solid-state electronic memory, magnetic memory, optical memory, or a combination of these. As illustrated in FIG. 1, memory 28 includes a removable/portable memory device 28a that can be an optical disk (such as a CD ROM or DVD); a magnetically encoded hard disk, floppy disk, tape, or cartridge; or a different form as would occur to those skilled in the art. In one embodiment, at least a portion of memory 28 is operable to store programming instructions for processor(s) 22. Alternatively or additionally, memory 28 can be arranged to store data other than programming instructions for processor(s) 22. In still other embodiments, memory 28 and/or portable memory device 28a may not be present. In one such example, a hardwired state-machine configuration of processor(s) 22 does not utilize memory-based instructions.

System 20 also includes computer network 30, which can be a Local Area Network (LAN); Wide Area Network (WAN), such as the Internet; another type as would occur to those skilled in the art; or a combination of these. Network 30 couples computer 40 to computer 21; where computer 40 is remotely located relative to computer 21. Computer 40 can include one or more processor(s), input devices, output devices, and/or memory as described in connection with computer 21; however these features of computer 40 are not shown to preserve clarity.

Computer 40 and computer 21 can be arranged as client and server, respectively, in relation to some or all of the data processing of the present invention. For this arrangement, it should be understood that many other remote computers 40 could be included as clients of computer 21, but are not shown to preserve clarity. In another embodiment, computer 21 and computer 40 can both be participating members of a distributed processing arrangement with one or more processors located at a different site relative to the others. The distributed processors of such an arrangement can be used collectively to execute routines according to the present invention. In still other embodiments, remote computer 40 may be absent.

Computer 21 executes logic with processor(s) 22 to perform various operations as will be described in greater detail hereinafter. This operating logic can be of a dedicated, hardwired variety and/or in the form of programming instructions as is appropriate for the particular processor arrangement. Such logic can be at least partially encoded on device 28a for storage and/or transport to another computer. Alternatively or additionally, the logic of computer 21 can be in the form of one or more signals carried by a transmission medium, such as network 30.

System 20 is also depicted with computer-accessible data sources or datasets generally designated as corpora 50. Corpora 50 include datasets 52 local to computer 21 and remotely located datasets 54 accessible via network 30. Computer 21 is operable to process data selected from one or more of corpora 50. The one or more corpora 50 can be accessed with a data extraction routine executed by processor(s) 22 to selectively extract information according to predefined criteria. In addition to datasets 52 and 54, corpora data may be acquired live or in realtime from local source 56 and/or remote source 58 using one or more sensors or other instrumentation, as appropriate. The data mined in this manner can be further processed to provide one or more corresponding visualizations in accordance with logic of processor(s) 22.

Figure 2:
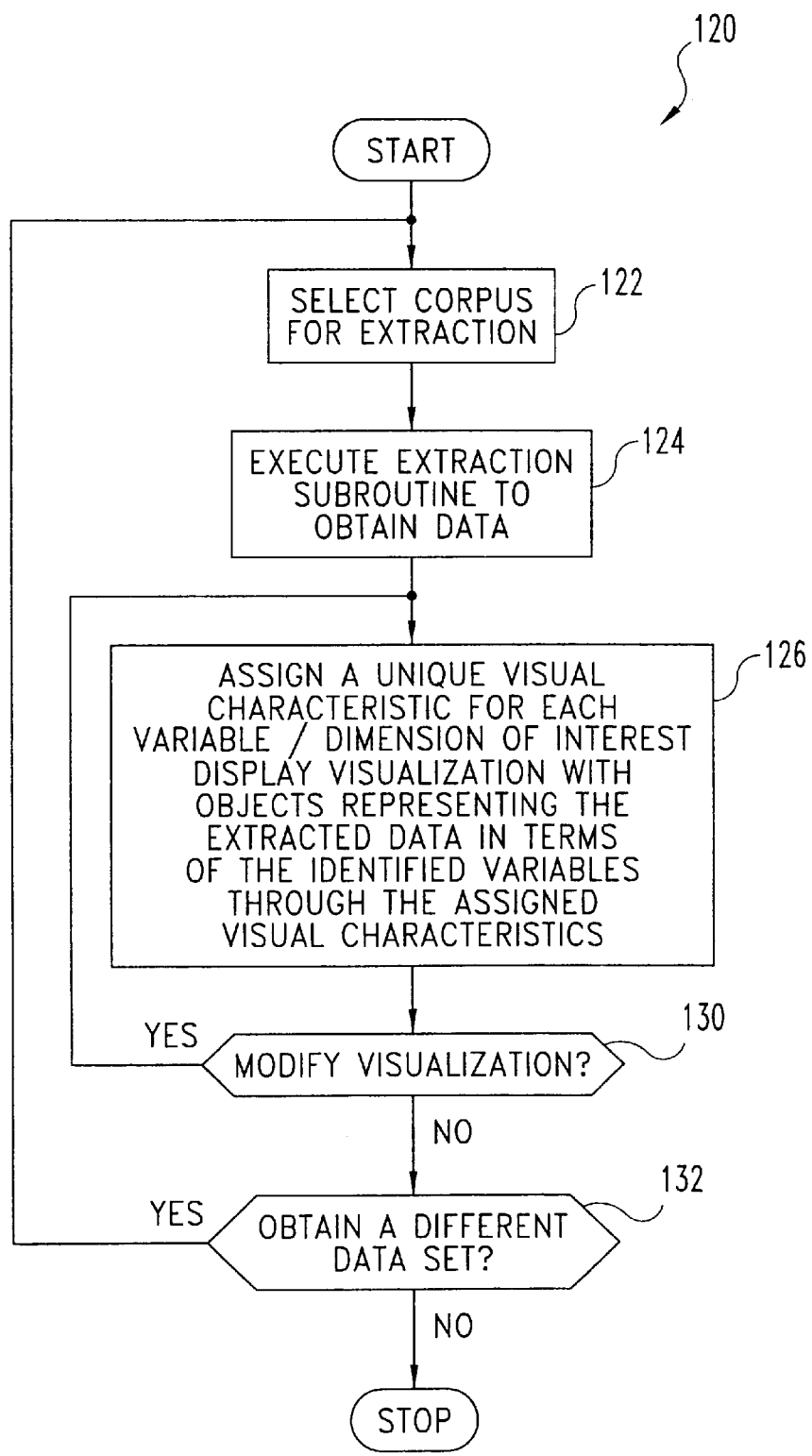
FIG. 2 is a flowchart illustrating details of a routine that can be executed with the system of FIG. 1.

Referring to FIG. 2, a flowchart of data visualization routine 120 executed with system 20 is further described. Routine 120 begins with stage 122 in which a data corpus is selected for extraction. Computer 21 includes appropriate Input/Output (I/O) for accessing, reviewing, transferring, and selecting corpus data in accordance with the operating logic of processor(s) 22. Such activities can be performed locally within a single computing unit, over a LAN, and/or through a remote connection such as the Internet.

Routine 120 proceeds from stage 122 to stage 124. In stage 124, one or more extraction subroutines are executed by processor(s) 22 of computer 21 to obtain data from the selected corpus. It should be understood that stage 122 and/or 124 can be optional depending on the data sought and the condition of the data desired. For example, review and selection of a corpus may not be needed if the source data has already been determined. Alternatively or additionally, one or more data tables, databases, or the like can already be provided rendering execution of an extraction subroutine unnecessary. At the conclusion of stage 124, a data set is provided in terms of a number of dimensions or variables, providing a number of information objects that are each, at least in part, a composite of multiple dimensions that can be described by a vector of values. These variables can be independent or dependent. Correspondingly, the data can be described in terms of one or more inherent dimensions—a property or characteristic measured or determined directly; and/or one or more synthetic dimensions—a property or characteristic derived or determined from one or more inherent dimensions. One nonlimiting example of a dataset includes weather information of interest for a number of U.S. cities. In this data set, twelve (12) dimensions or variables are included as defined by the following Table 1.

TABLE 1

| Variable Number | Variable Name | Variable Description |
|---|---|---|
| 1 | LAT | City Latitude |
| 2 | LONG | City Longitude |
| 3 | ELEV | City Elevation |
| 4 | PRECIP | Annual Precipitation for the City |
| 5 | SNOW | Annual Snowfall for City |
| 6 | HEAT-DEG DAY | Heat-Degree Days for the City |
| 7 | COOL-DEG DAY | Cool-Degree Days for the City |
| 8 | DAYS T'STRM | Days of Thunderstorms Per Year for the City |
| 9 | DAYS FOG | Days of Fog Per Year for the City |
| 10 | APR WIND | Average Maximum Wind Velocity for the Month of April |
| 11 | HIST HIGH | Historical High Temperature for the City |
| 12 | HIST LOW | Historical Low Temperature for the City |

It should be understood that this multi-dimensional data is merely representative, and many other variables and/or data collections could be selected through routine 120.

From stage 124, routine 120 continues with stage 126. In stage 126 a visual characteristic is selected to uniquely identify each variable dimension of interest. Stage 126 begins with the selection of a data visualization format, typically in a two-dimensional or three-dimensional orientation such as a pie chart, histogram, line-plot, area graph, and/or scatter plot of data points, to name just a few possibilities. Accordingly, the relationship between the data and one or more variables can be visualized with one or more pie sectors, bars, lines, areas, data points, and/or other objects. A characteristic of such visualization objects can be selected to indicate different levels or thresholds of a variable of interest. These characteristics can include object color, size, shape, shading, and/or position, to list only a few. One common arrangement is to use the position and/or shape of a visual data object relative to one or more axes to represent the degree or amount of one or more corresponding variables. The cartesian coordinate system is a multi-variable example of such an arrangement.

Figure 3:
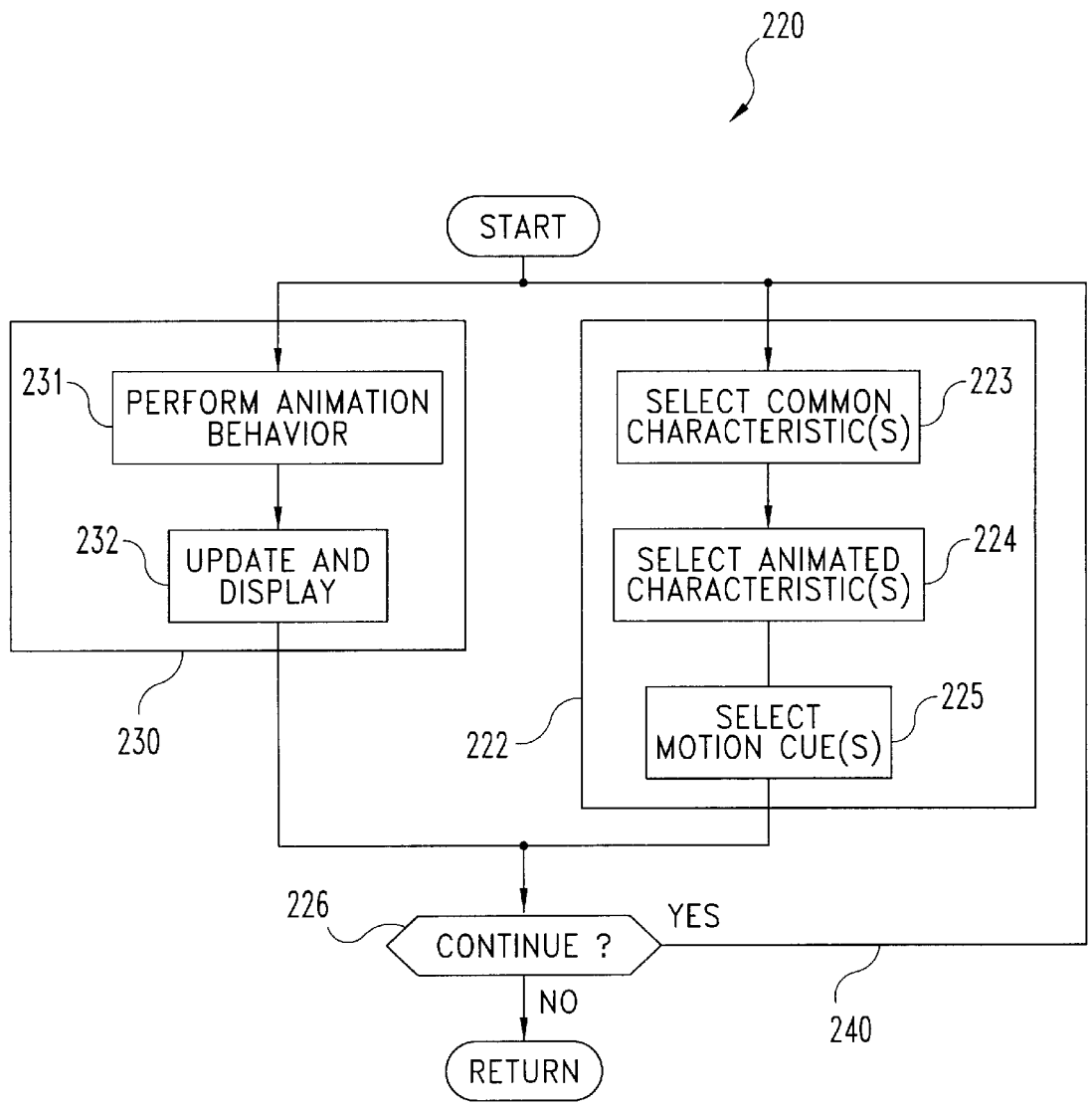
FIG. 3 is a flowchart of a subroutine executed as part of the routine of FIG. 2.

Another visualization characteristic that can be assigned to represent a data variable is animation. Referring additionally to FIG. 3, animation selection subroutine 220 is illustrated in a flowchart form. Subroutine 220 starts in stage 222 with the selection of an animation pattern to represent a dependence of one or more visualization objects on a variable. A pattern can be selected from a predefined list or a custom pattern defined by an operator through appropriate interface logic executed by processor(s) 22. In one nonlimiting example, an operator defines the animation pattern by tracing a desired path of animated movement interactively.

As illustrated, the selection of an animation pattern can include selecting an animation characteristic that is common to all visualization objects dependent on the variable to be represented by the animation pattern in stage 223. This common animation characteristic can be used to identify the visualization objects being animated by the given pattern as a group. One example of an animated characteristic that is common to the visualization data objects for a given pattern is to impart to each data object a similarly shaped motion pathway, such as a closed loop.

In stage 224, a varying animation characteristic can be selected in addition to the common animation characteristic of stage 223. This varying animation characteristic can visually vary to indicate differences in level, value, and/or degree of the variable common to the objects of the group. One example of a varying characteristic would be to vary the size of a commonly shaped pathway in accordance with variation of the represented variable value.

Stage 125 depicts assignment of a motion cue to better impart a sense of motion, and/or to better perceive common or differential motion of the objects being animated. Examples of such cues are blurring of an object as it moves, a residual "tail" indicating the path being followed, rays radiating from the center of a pathway to the current object position, rays radiating from a reference object position to the current position of the moving object, and the like. A given animation pattern selected in stage 222 can have one or more animation characteristics that are the same for each of the objects dependant on the animation variable per stage 223, one or more animation characteristics of such objects that vary with the animation variable being represented per stage 224, and one or more motion cues per stage 125. In other embodiments, one or more of the assignments in stages 223–225 may be operator-selectable, optional, derived algorithmically to indicate certain types of relationships between the data objects and/or among dimensions (such as dependency, relative sensitivity, cooccurance), or absent.

As the operator or system makes new assignments of animation characteristics in stage 222, the animated visualization objects are displayed in stage 230. Stage 230 is executed in parallel with stage 222, being responsive to animation changes implemented in stage 222. During stage 230, animation behaviors are performed in stage 231 per selections in stage 222 and a display of the resulting animation is provided in stage 232. Subroutine 220 proceeds from stages 222 and 230 to conditional 226 which tests if subroutine 220 is to continue, if so, subroutine 220 returns via loop 240 to repeat stages 222 and 230. Conditional 226 can be included as a Graphical User Interface (GUI) display option provided with the animated object display in stage 232. Animation controls can be provided for stages 222 and/or 230 to permit adjustment of the speed, direction, and other properties of the animated display by an operator and/or in accordance with a system algorithm. Alternatively or additionally, movies and/or still images of the resulting animation patterns can be created for storage and/or export. Furthermore, the visualization can include viewing assistance features, such as a zoom-in and/or zoom-out capability, an animation speed adjustment, highlighting tools, and different tools to modify the visualization, just to name a few. The selection of animation characteristics in stage 222 and computation and display of the resulting animation in stage 230 can continue and interactively as loop 240 repeats. Loop 240 can repeat indefinitely in this manner until conditional 226 is negative, in which case control returns to routine 120.

Figure 4:
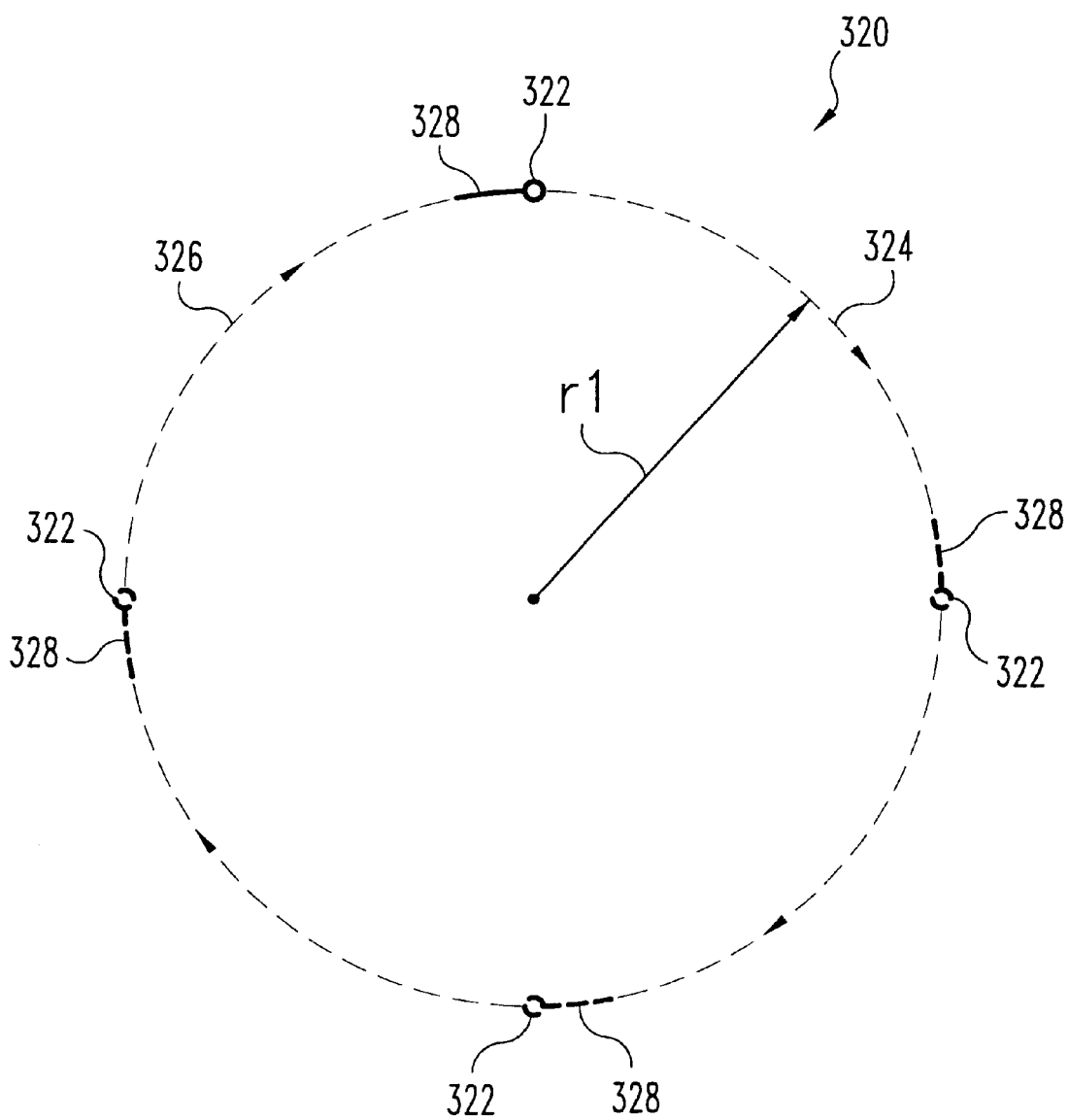
FIG. 4 is a diagram of one type of animation pattern according to the present invention.

Referring next to the nonlimiting example of FIG. 4, animation pattern 320 is illustrated for visual object 322. Object 322 can be comprised of one or more pixels presented with a graphic display. Object 322 is animated by traveling along broken line path 324 at a speed detectable by the human eye. Path 324 has a generally circular, closed looped shape 326 with radius r1. The direction of travel of object 322 along path 324 is in a clockwise (CW) direction as indicated by arrowheads. The position of object 322 as it travels along path 324 is shown in phantom at several generally equally spaced time intervals. The motion cue 328 of object 322 is in the form of a residual "tail" along path 324.

Figure 5:
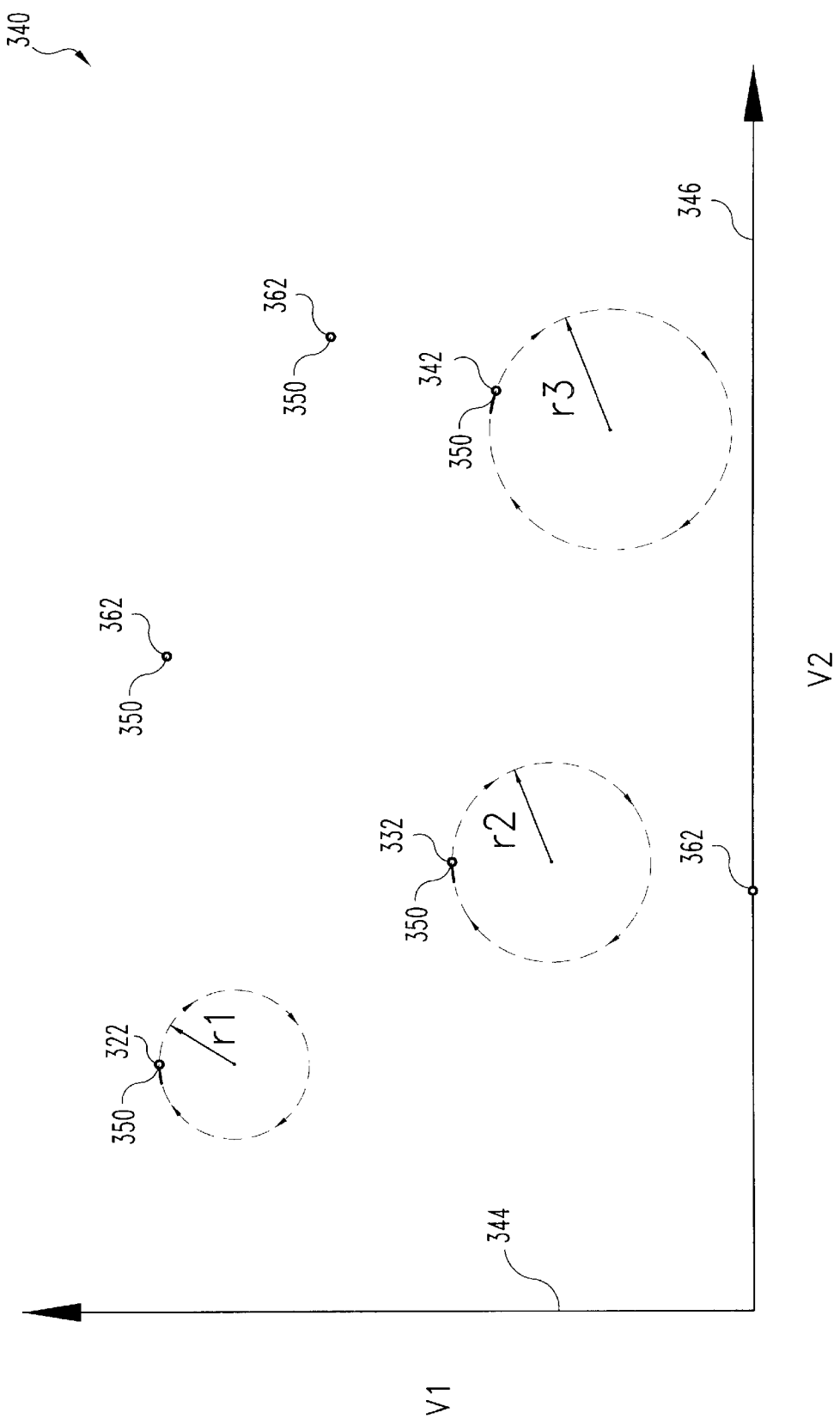
FIG. 5 is a visualization of a number of data objects utilizing the pattern of FIG. 4.

It should be appreciated that a number of objects can be presented in the manner depicted in FIG. 4 as shown, for example, in visualization 340 of FIG. 5. Visualization 340 includes a number of data objects 350 (those designated by reference numerals 362,322,332,342) each displayed in terms of a different combination of variables V1, V2, and V3. Visualization 340 includes objects 322, 332, and 342 that exhibit animated behavior. Visualization 340 also includes data objects which do not exhibit animated behavior designated by reference numeral 362. Axes 344 and 346 illustrate the mapping of objects 350 on variables V1 and V2, respectively. Each object 350 position corresponds to a rectangular coordinate mapping to variables V1 and V2. A third variable V3 is indicated by animation. Specifically, values of variables V3 within a selected range are indicated by imparting a clockwise rotational pattern to each object 322, 332, and 342. In contrast, objects 362 each have a value of variable V3 that does not meet the animation threshold. In one instance, the value of variable V3 can be nonzero for the animated object group while it is substantially zero for objects 362.

The common rotational motion of members in the animated group of objects 322, 332, and 342 provide a way to readily distinguish this group from the nonanimated objects 362. In addition to an animation characteristic that is generally the same for each animated object, such as the closed loop motion of animated objects 322, 332, and 342; the animation pattern includes a varying characteristic to represent different degrees of variable V3 among the animated object group members. More specifically, the radii r1, r2, and r3 of objects 322, 332, and 342, respectively, are all different according to the different levels of variable V3. Correspondingly, the circumference and the area circumscribed by objects 322, 332, and 342 vary with the different radii r1, r2, and r3. Alternatively or additionally, other characteristics can be used to represent properties common to all the animated objects of a group and/or properties that vary among the animated objects of such a group, such as animation speed, animation phase, object coloration, size, shape, brightness, translucency, contrast, and/or shading, to name just a few. In still other embodiments, varying characteristics may be absent. Indeed, in one nonlimiting form of this type of embodiment, variable V3 is of a binary type such that there are only two discrete levels—one being indicated by animation and the other being indicated by the absence of animation.

Figure 6A:
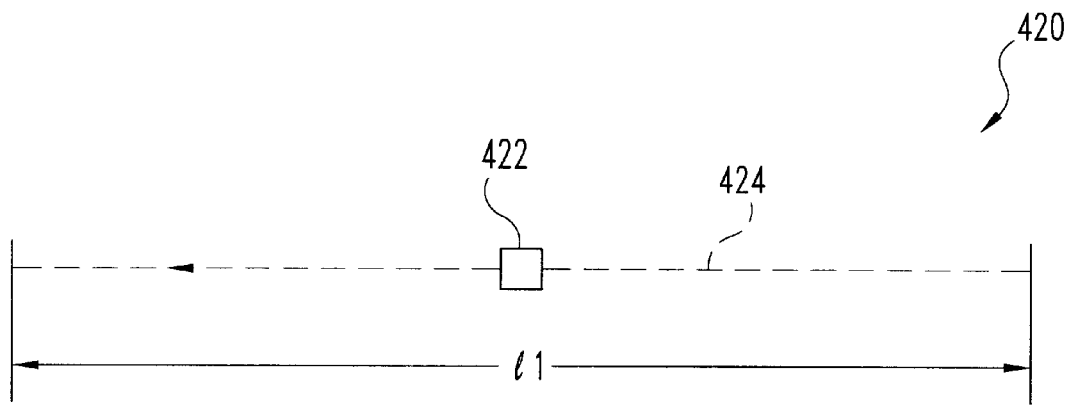
FIGS. 6A–6C illustrate a different type of animation pattern according to the present invention.
Figure 6B:
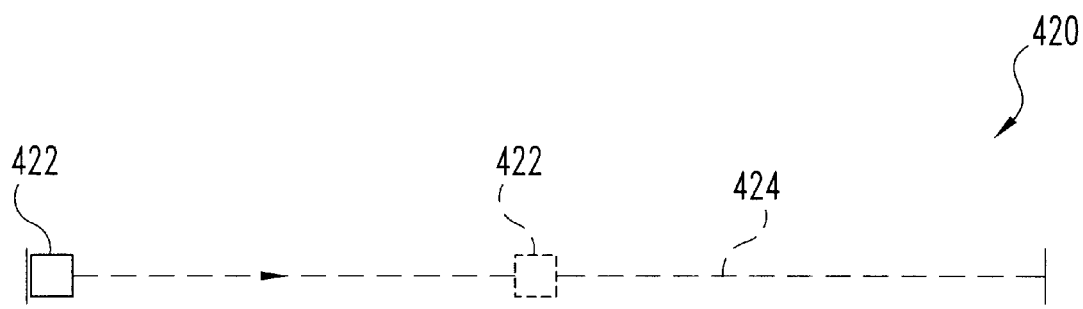

It should be understood that in still other embodiments utilizing animation, different object types, animation patterns, numbers and types of variables, and/or motion cues can be used. Such as, for example, the animation pattern 420 illustrated by FIGS. 6A, 6B, and 6C. For pattern 420, displayed object 422 travels along path 424 as shown in FIG. 6A. Path 424 is represented by a broken line segment of length l1 and is generally straight. From the approximately central position of object 422 along path 424 in FIG. 6A, object 422 travels to the left as indicated by the corresponding arrowhead until the left-most end of path 424 is reached as illustrated in FIG. 6B. FIG. 6B also shows the FIG. 6A position of object 422 in phantom for comparison.

Figure 6C:
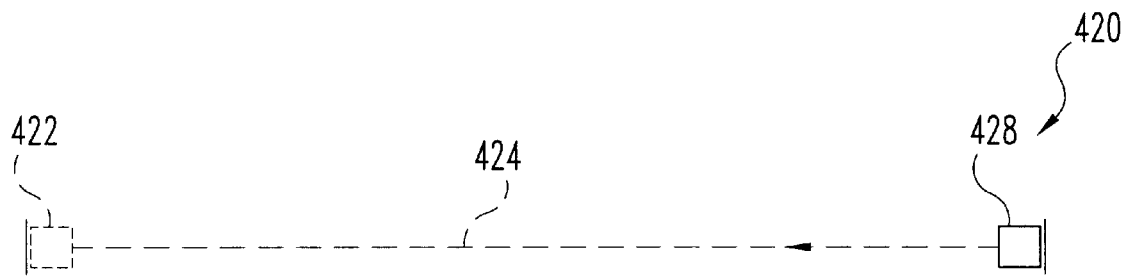

In FIG. 6B, object 422 reverses direction to move towards the right as indicated by the corresponding arrowhead. As shown in FIG. 6C, object 422 continues in this direction until the right-most end of path 424 is reached. FIG. 6C also shows the FIG. 6C position of object 422 in phantom for comparison. In FIG. 6C, object 422 again reverses direction to move towards the left passing through the position shown in FIG. 6A and continues on to the position illustrated in FIG. 6B, and so on. This oscillatory, back-and-forth motion of object 422 in a horizontal direction can be used like the loop patterns of FIGS. 4 and 5 to represent a designated variable in a visualization. Moreover, multiple data objects can oscillate in this way to readily visualize a group having a given relationship to a selected variable. Optionally, variation in the degree of the oscillation such as the relative length of path 424, the speed of oscillation, the orientation or angle of the pathway relative to a reference axis (e.g. a vertical or horizontal axis), and the like, can be used to indicate different levels of the corresponding variable.

Figure 7:
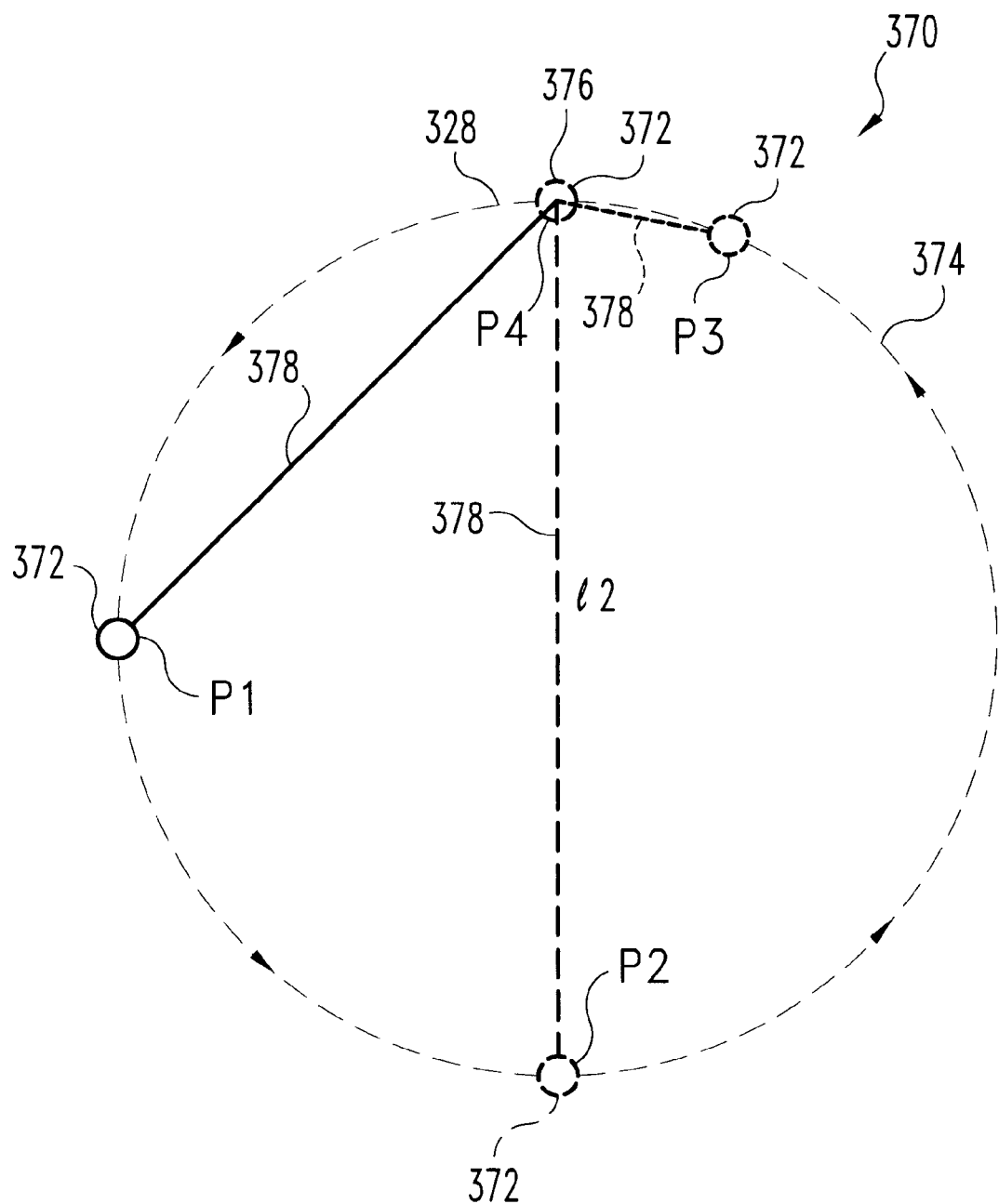
FIG. 7 is a diagram of still another type of animation pattern according to the present invention.

In another aspect, an animation pattern can be varied by using different motion or movement cues. FIG. 7 depicts pattern 370 for visualization object 372. Object 372 moves along a generally circular, closed loop pathway 374 in a counter-clockwise (CCW) direction as indicated by corresponding pathway arrowheads. Object 372 is shown in a few of its positions in FIG. 7 as designated by P1, P2, P3, and P4. For positions P1, P2, and P3 along pathway 374, object 372 includes animated motion indicator 378 that is in the form of a line segment. This line segment is not present for position P4 of object 372 at the top-most location 376. However, as object 372 descends from position P4 along path 374 its location relative to location 376 is indicated through the appearance of the connecting line segment of indicator 378. Accordingly, the length of indicator 378 changes as object 372 moves along pathway 374 in a counter-clockwise direction, being its longest when at position P2 (indicated as length l2) and being absent at position P4. In position P1, a solid line portrayal of object 372 with the connecting indicator 378 is provided to correspond to the current location. Further to the left, positions P2, P3, and P4 are illustrated in phantom to correspond to locations of object 372 at other points in time during the animation. When multiple objects are animated each having a motion-cue indicator 378, the relative length and/or relative angles of the line indicators for different objects 372 can be used to show different corresponding amounts of the animated variable. It has been found that this form of indicator can readily assist with the recognition of objects belonging to an animated group that do not fit the usual pattern. In still other embodiments, a different motion cue is used or a motion cue may be absent.

Referring back to FIG. 3, as an animation pattern is selected or defined in stage 222, it is simultaneously viewed and tested in stage 230. Stages 222 and 230 continue in this manner via loop 240 while conditional 226 remains true (affirmative), permitting the data object operator and/or system to refine/modify the animated pattern presented. Loop 240 continues until such time as the operator/system elects to stop working with the animated pattern as represented by conditional 226, returning to routine 120.

Figure 8:
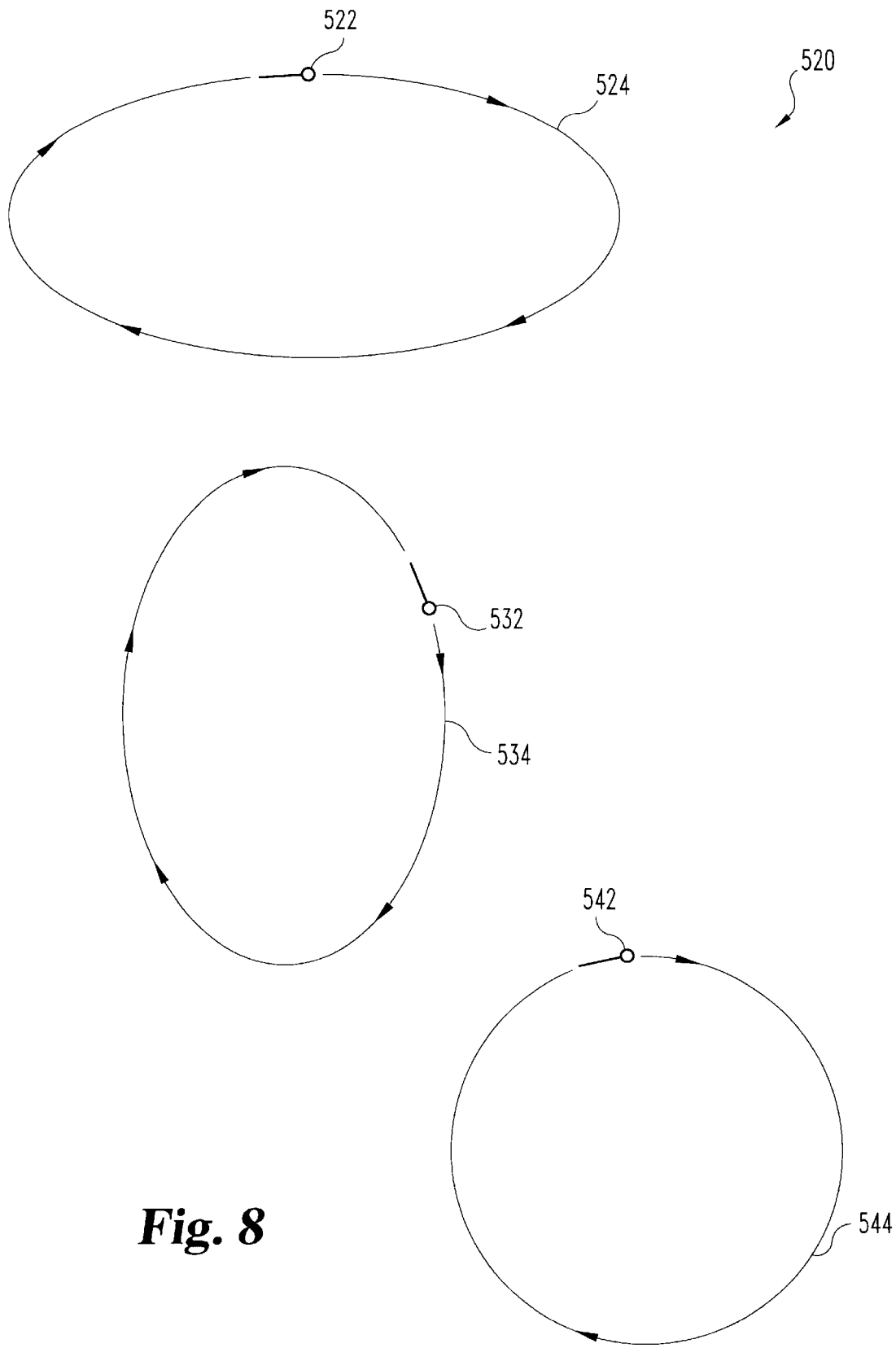
FIG. 8 is a visualization of several objects combining multiple animation patterns to represent different combinations of corresponding variables.

Subroutine 220 can be used to assign multiple different animation patterns to different variable/dimensions of the data. Such multiple animation assignments can provide distinctive patterns to indicate relative combinations of multiple variables represented by animation. For example, referring to FIG. 8, visualization 520 illustrates animated objects 522, 532, and 542 that represent variable X with pattern 320 of FIG. 4 and variable Y with pattern 420 of FIGS. 6A–6C in various combinations. Objects 522, 532, and 542 follow looped paths 524, 534, and 544, respectively, in a clockwise rotational direction. Paths 524, 534, and 544 are each represented by a solid line in FIG. 8, and are shaped according to different relative levels of variables X and Y. The horizontally flattened path 524 of object 522 corresponds to a greater contribution of pattern 420 than pattern 320. The generally circular path 544 of object 542 corresponds to a greater contribution of pattern 320 than pattern 420. Path 534 of object 532 corresponds to a mixture of the influences of pattern 320 and pattern 420 that is more balanced compared to paths 524 and 544 of objects 522 and 542, respectively. The different composites of animation patterns 320 and 420 for objects 522, 532, and 542 each correspondingly illustrate a different combination of values for variables X and Y. Further, variation of objects 522, 524, and 542 in the level of a common variable, such as X or Y, can be visualized in combined animation patterns by various characteristics. For example, such varying characteristics can include the length of an animation pathway, animation speed, animation phase, direction of movement, object color, size, shading, brightness, translucency, contrast, and/or shape just to name a few. Composites of two or more animation patterns each representative of a different dimension/variable can be made by adding together components of the patterns, taking a difference between components of the patterns, averaging components of the patterns, selecting respective minima and/or maxima of the patterns, or through such different techniques as would occur to one skilled in the art.

Returning to FIG. 2, in stage 126 (of which subroutine 220 was one nonlimiting example) all visual characteristics for the variables/dimensions of interest are assigned and the visualization is displayed. Routine 120 is arranged with software tools to facilitate ongoing modifications to the visualization characteristics, including those associated with animation patterns. As visualization changes are made with these tools, the visualization display is correspondingly updated. The visualization can be presented with a colored graphic form of display 26a. Routine 120 continues with conditional 132 which tests if a different data set is to be processed. If so, routine 120 returns to stage 122. Otherwise, routine 120 halts.

Figure 9:
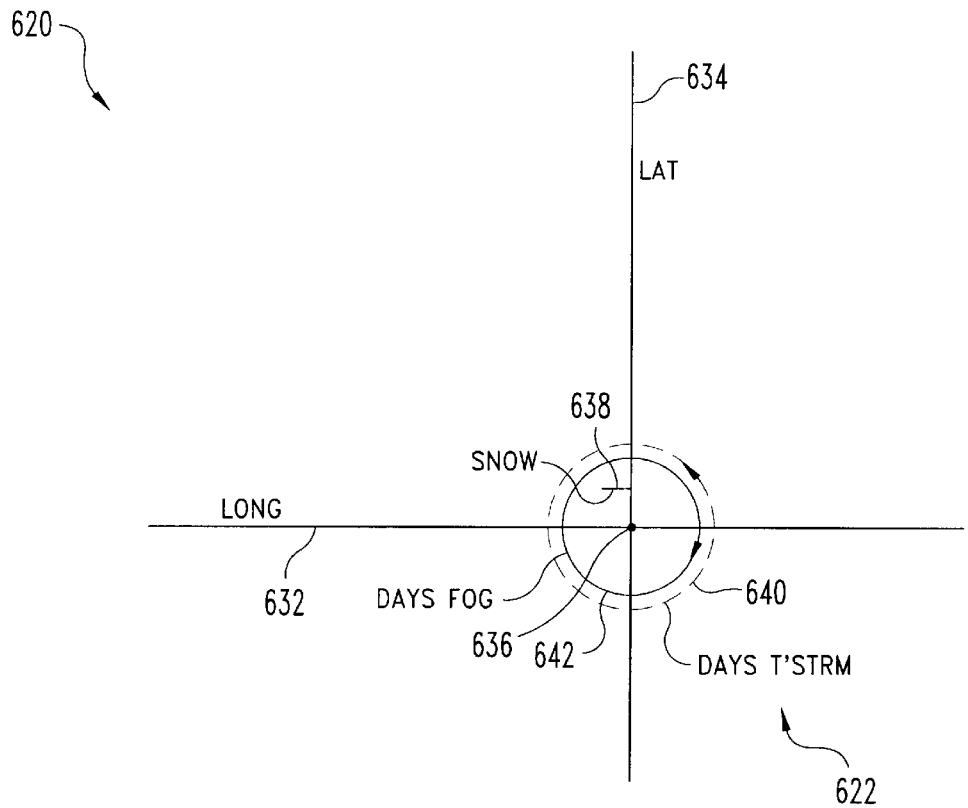
FIG. 9 is a diagram of a graphical user interface (GUI) tool to assign an animation pattern to a data variable.
Figure 10:
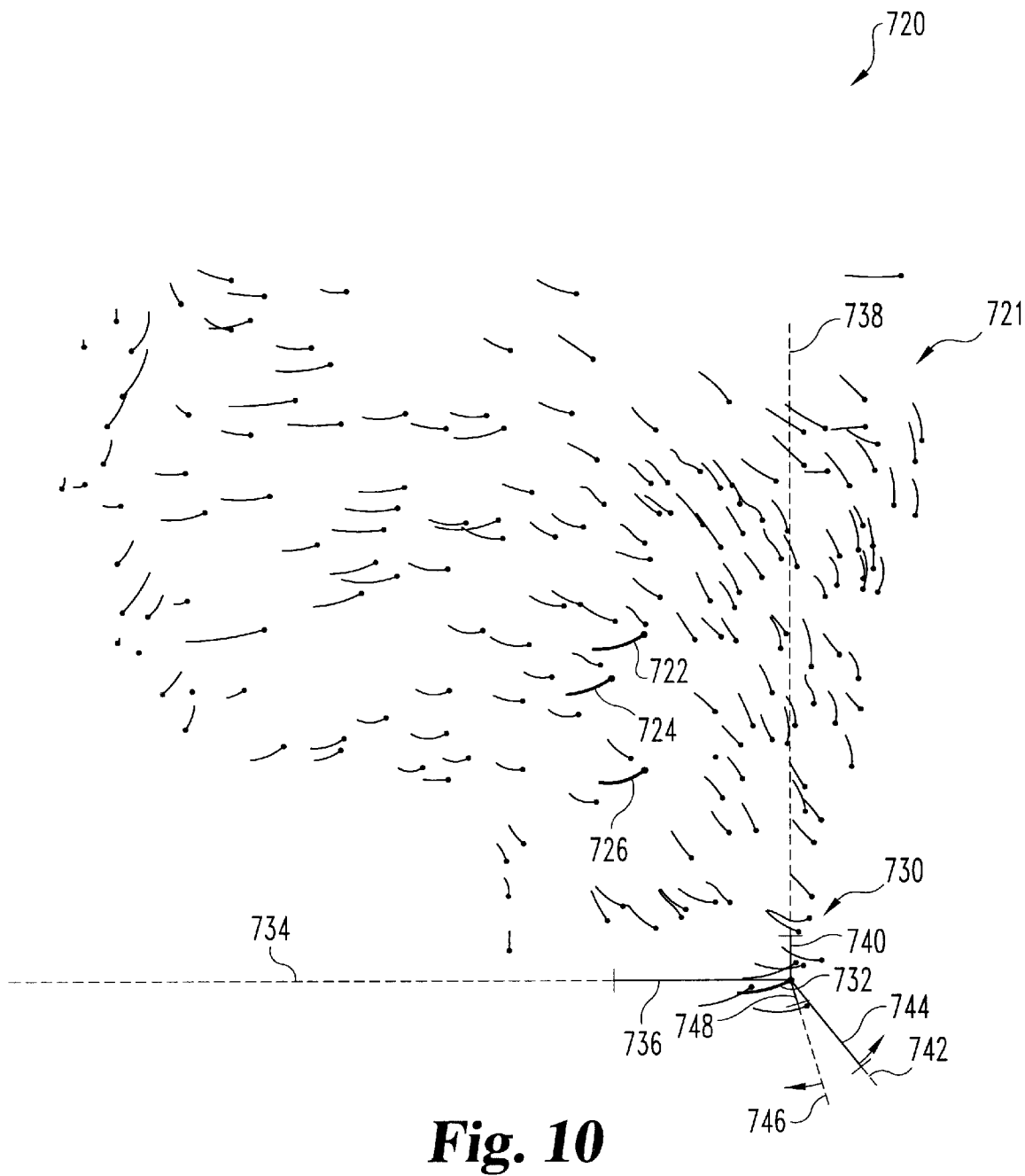
FIGS. 10–13 depict a sequence of four images for one form of animated visualization according to the present invention.
Figure 11:
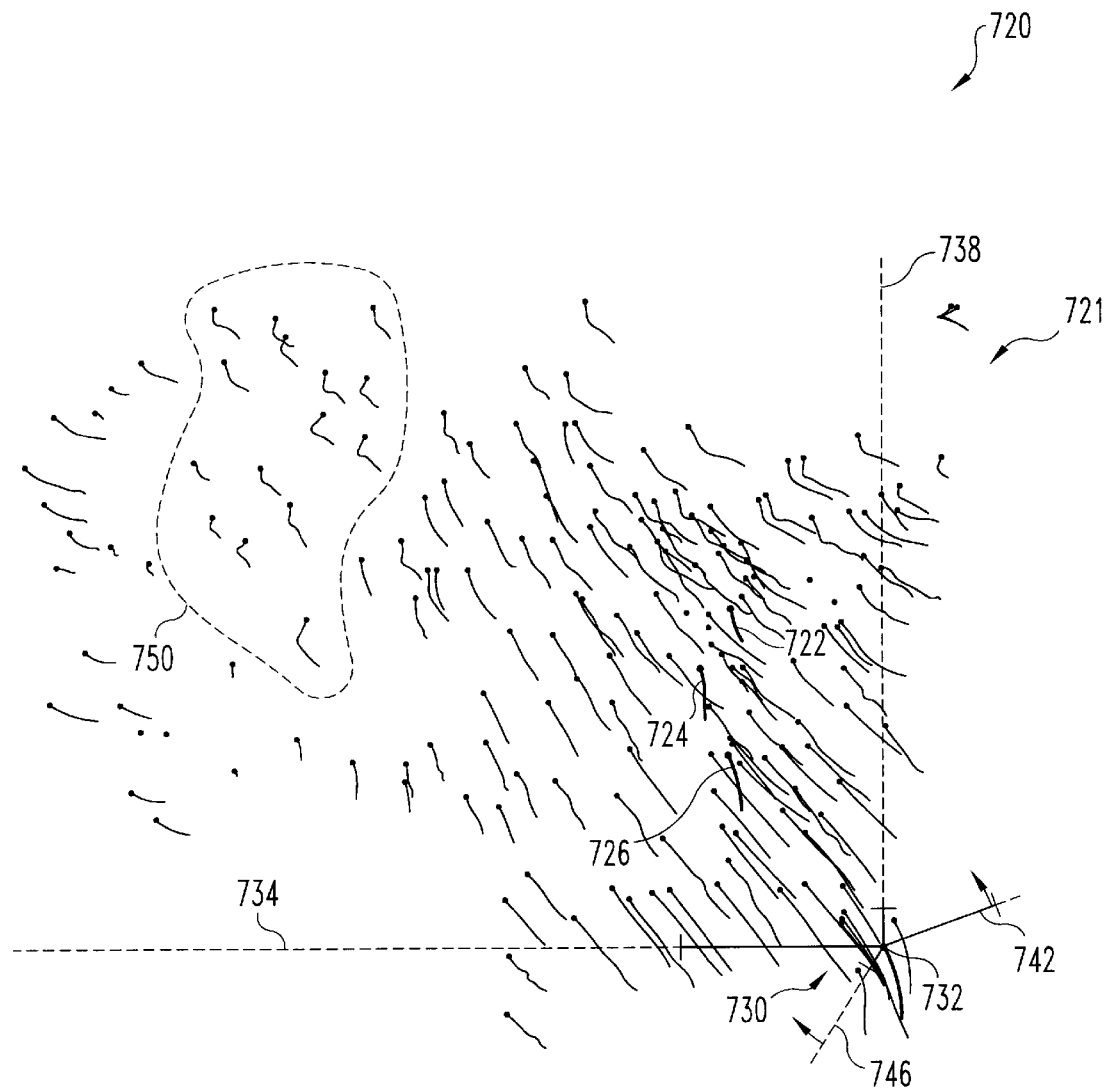
Figure 12:
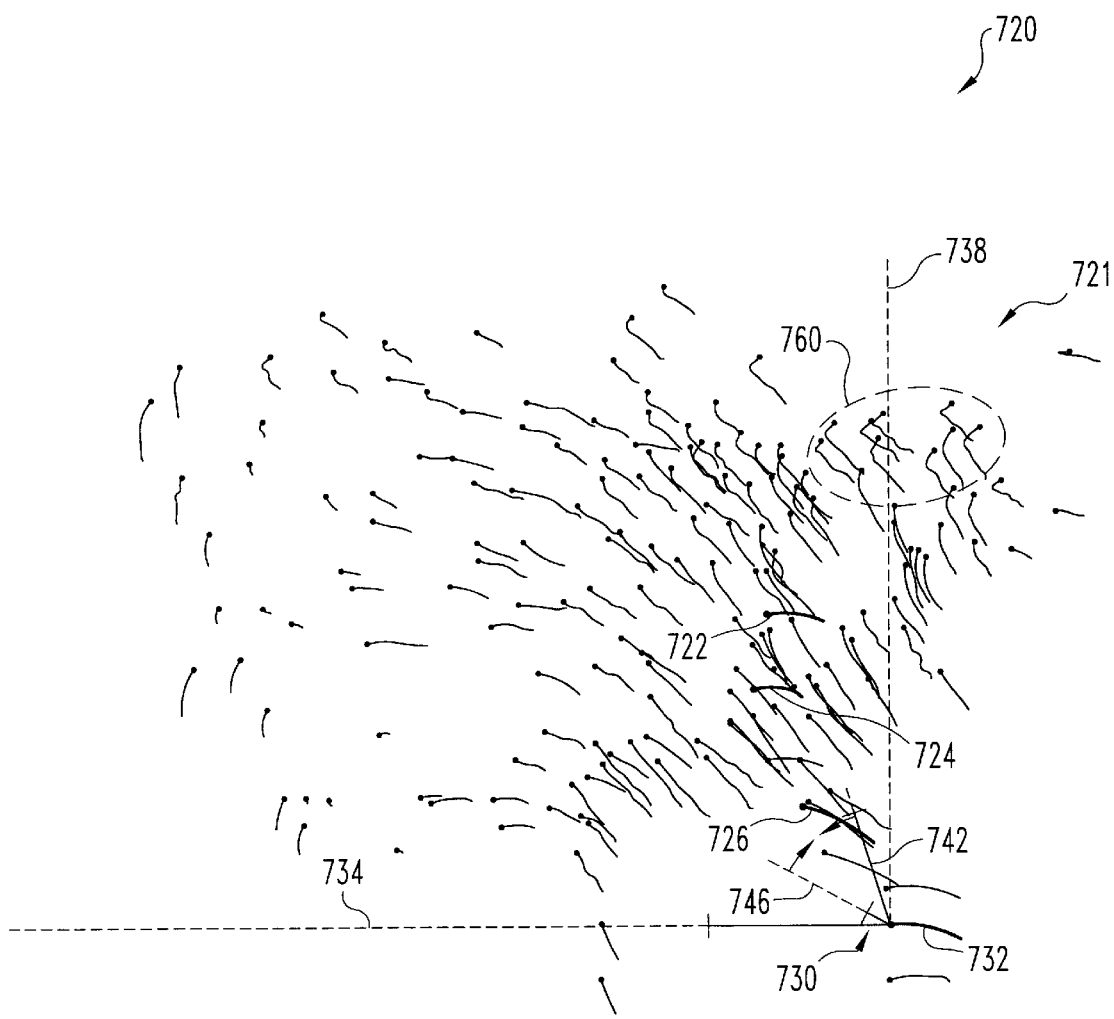
Figure 13:
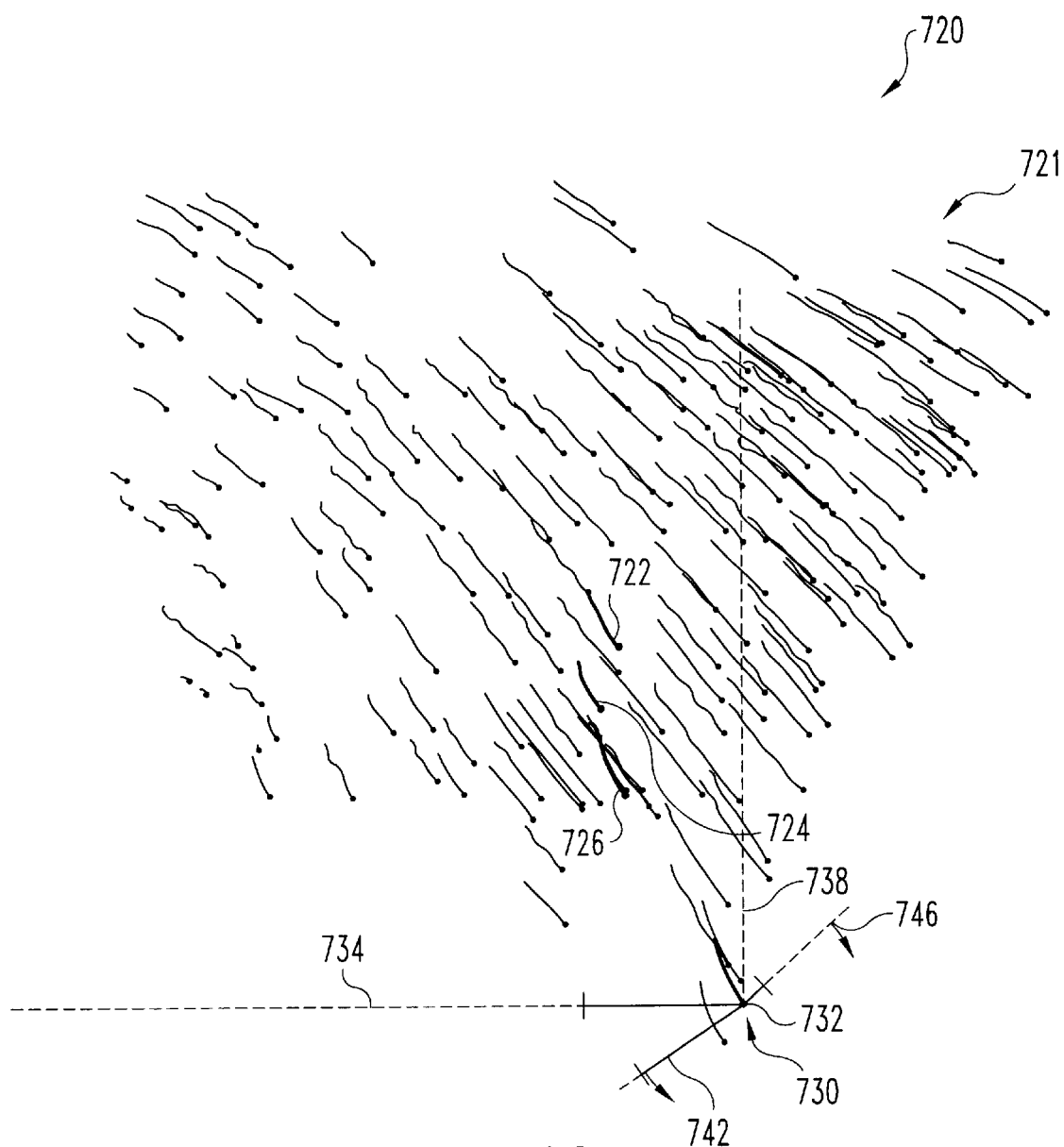

FIG. 9 depicts Graphical User Interface (GUI) control tool 620 for preparing an animated visualization of the twelve dimensional (12-D) city weather data previously described in connection with Table 1. Control tool 620 can be used to assign animation characteristics to one or more of the dimensions in accordance with routine 120 and subroutine 220 as executed with system 20. FIGS. 10–13 present animated visualization 720 defined, at least in part, with control tool 620 as will be more fully described hereinafter.

Control tool 620 includes variable assignment visualization graph 622 and dimension legend 624. As depicted, control tool 620 statically assigns city longitude to axis 632 and city latitude to axis 634. Axes 632 and 634 cross at intersection 636. Control tool 620 also illustrates the assignment of different animated characteristics to three different dimensions: SNOW, DAYS T'STRM, and DAYS FOG. The variable SNOW is animated by a left-right oscillation or "jitter" as described in connection with pattern 420 of FIGS. 6A–6C. Line segment 638 of graph 622 depicts this assignment. The variable DAYS T'STRM is depicted as a counterclockwise closed loop motion as described in connection with FIGS. 4 and 5. Loop 640 represents the pathway for the motion of DAYS T'STRM about intersection 636. The variable DAYS FOG is depicted as a clockwise closed looped motion like that described in connection with FIGS. 4 and 5, and has a pathway represented by loop 642 about intersection 636. The assigned variables of tool 620 are each underlined in legend 624. The depiction of additional or alternative dimensions with tool 620 results in such dimension names being underlined and depicted in the sample graph 622 in a corresponding manner.

Referring to FIGS. 10–13, four different images of visualization 720 for the city weather data are shown each corresponding to a different frame of an animation sequence. In each of these figures, a number of city data objects 721 are presented. Visualization 720 can be provided with a graphic display included in system 20 as described in connection with routine 120. Each city data object 721 has a dot or "head" with a "tail" type of motion cue. The position of each city data object 721 generally corresponds to the city's latitude and longitude relative to the other city data objects 721. Accordingly, the city data objects 721 collectively indicate the shape of the contiguous 48 states of the United States of America.

The cities of Paducah, Ky.; Memphis, Tenn.; Meridian, Miss.; and Miami, Fla. are more specifically represented by city data objects 722, 724, 726, and 732, respectively. Data objects 722, 724, 726, and 732 are shown slightly enlarged relative to the other city data objects 721 to enhance clarity. Alternatively or additionally, color or another contrasting characteristic or characteristics could be used to highlight cities of interest. The animation behavior of each city data object 721 repeats in a continuous manner with FIGS. 10–13 representing images of this pattern at equal time intervals. From FIG. 13, city data object 721 returns to the position shown in FIG. 10, and the pattern repeats. It should be understood that there can be several intermediate positions of city data objects 721 and corresponding frames presented between those shown in the sequence of FIGS. 10–13.

FIGS. 10–13 further illustrate an optional highlighting tool 730 that has been applied to the city of Miami, Fla. (object 732). Tool 730 includes a number of axes to represent selected dimensions. Axis 734 represents longitude of the highlighted city Miami, Fla. The overall length of axis 734 (both dashed and solid segments) corresponds to the range of longitude for cities of visualization 720. The length of the solid line segment 736 of axis 734 represents the longitude of Miami relative to the longitude range. Likewise, axis 738 has an overall length of both dashed and solid segments representative of the range of latitude for cities of visualization 720. Axis 738 includes solid line segment 740, the length of which corresponds to the latitude of Miami relative to this latitude range.

Tool 730 also highlights two animated variables: DAYS T'STRM and DAYS FOG with axes 742 and 746, respectively. The length of axis 742 and 746 represent the maximum value of the corresponding variables DAYS T'STRM and DAYS FOG. Axes 742 and 746 include respective solid line segment 744 or 748 representing the value of the DAYS T'STRM and DAYS FOG variables for Miami relative to these maxima. Axes 742 and 746 have the further property of animation. In correspondence to the assignments with tool 620, axis 742 rotates in a counter-clockwise direction and axis 746 rotates in a clockwise direction as represented by the attendant arrows in FIGS. 10–13. For Miami, the variable SNOW is nonexistent, and so it is not represented by tool 730.

The animation of each city object 721 combines the animated patterns of the variables SNOW, DAYS T'STRM, and DAYS FOG. It should be understood that the more rectilinear pattern of the data object tails illustrated in the Rocky Mountain region 750 of FIG. 11 and the Great Lakes region 760 of FIG. 12 correspond to a greater degree of the variable SNOW, as compared to those areas, such as Miami, Fla., where snowfall is less frequent or nonexistent. As to the combination of the variables DAYS FOG and DAY T'STRM, the object rotational direction and vertical movement is determined by the combination of the two. If the level of these two variables is such that the clockwise and counter-clockwise patterns are of about the same weighting, the object can indicate this circumstance by oscillating along an approximately vertical line.

Referring to FIGS. 14–17, a sequence of frames at generally equal time intervals for animated visualization 820 are illustrated. Visualization 820 includes city data objects 821 representative of the same data as visualization 720 of FIGS. 10–13, and can be presented in a like manner. The relative position of each city data object 821 is based on longitude and latitude dimensions as in the case of city data objects 721 of visualization 720. City data objects for Paducah, Ky.; Memphis, Tenn., and Meridian, Miss. are represented by reference numerals 822, 824, and 826, respectively. Data objects 822, 824, and 826 are enlarged relative to other city data objects for highlighting purposes.

Figure 15:
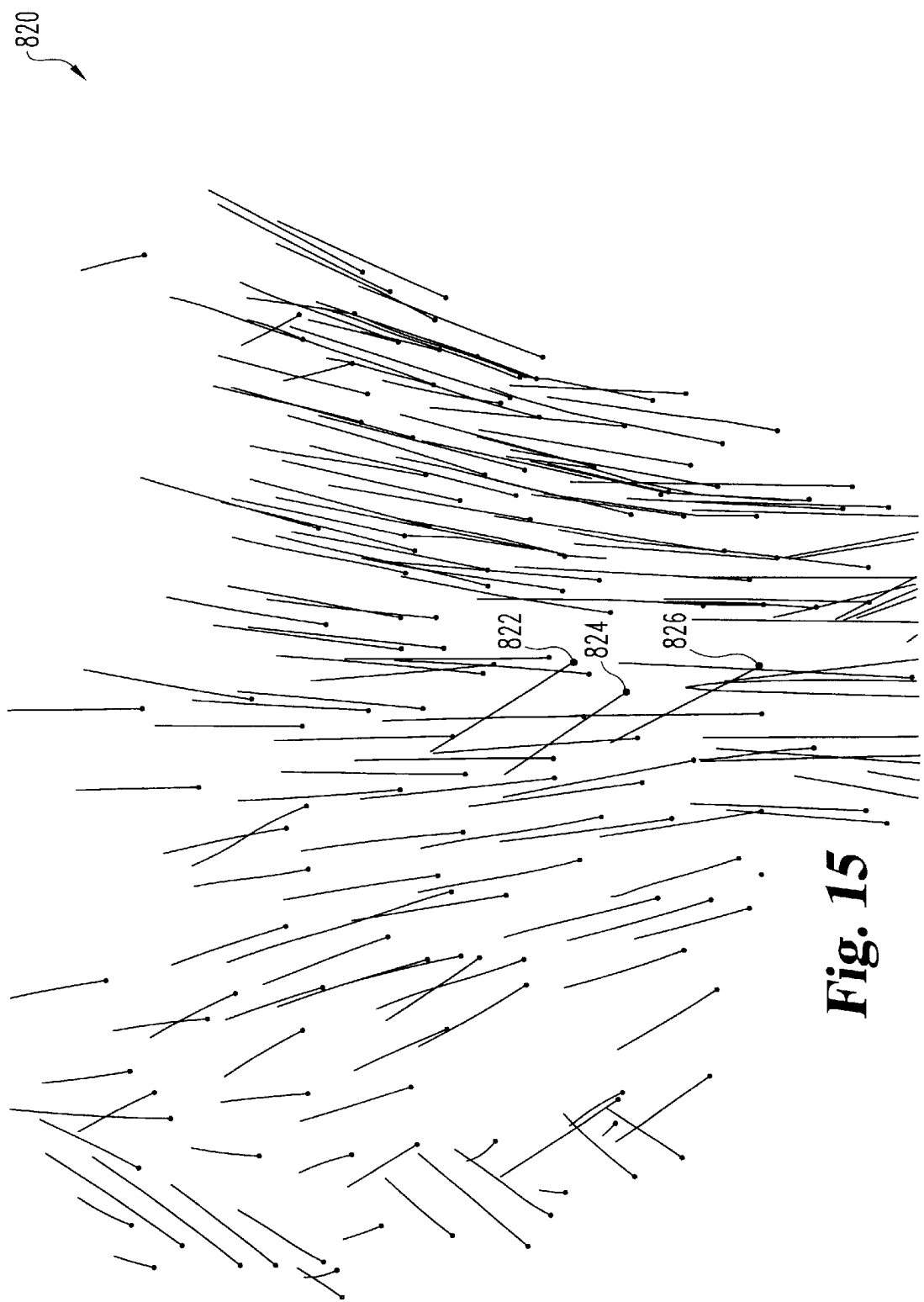
Figure 16:
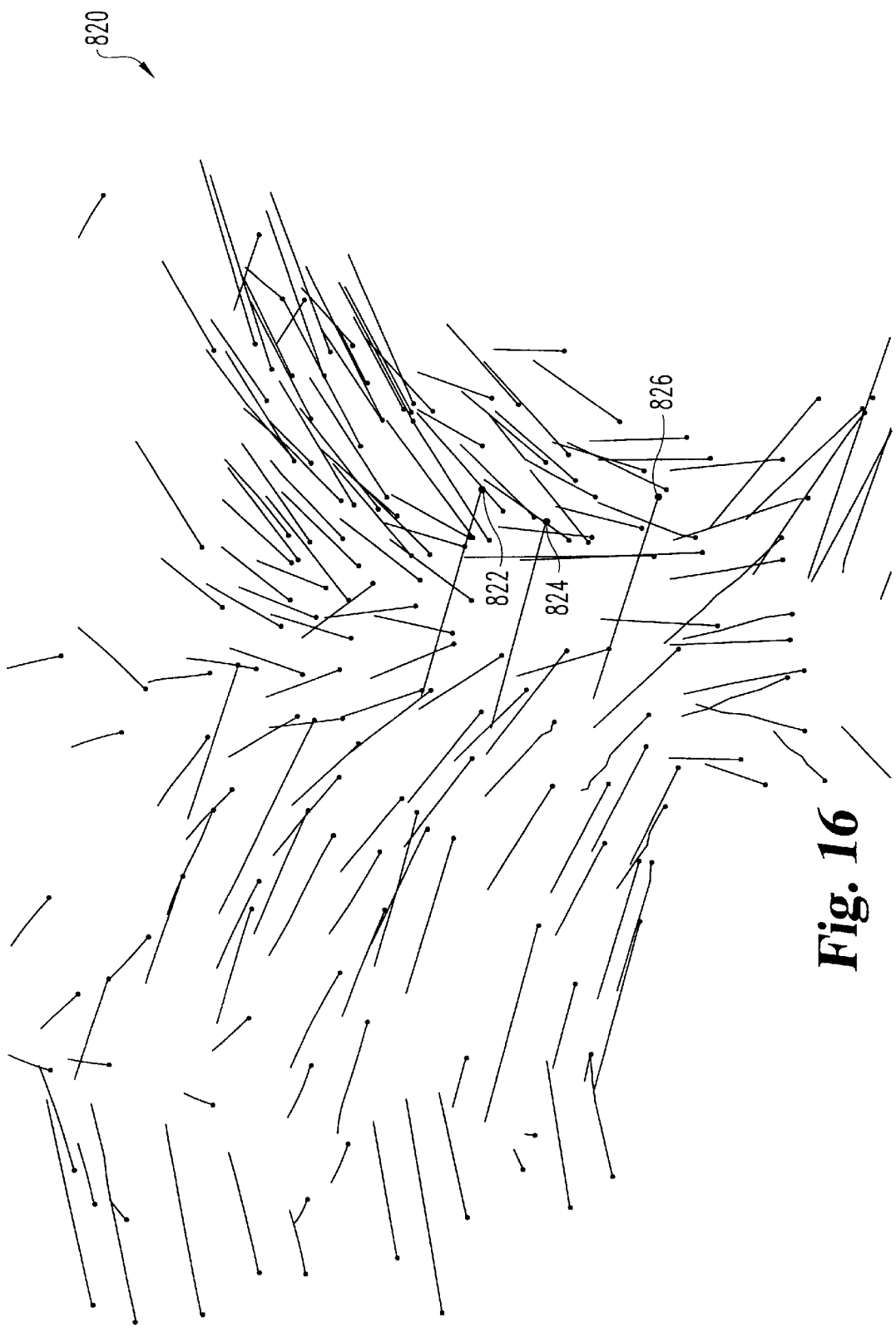

The animation behavior of city data objects 821 is repetitive as described in connection with visualization 720. Specifically, each of FIGS. 14–17 represent an animation frame at a different, generally equally spaced time interval such that city data objects 821 each return to their respective location shown in FIG. 14 from FIG. 17. It should be understood that a few of the city data objects in the lower portion of FIGS. 15 and 16 are not shown, due to the animation pattern for these objects exceeding the limits of the viewing area.

Figure 14:
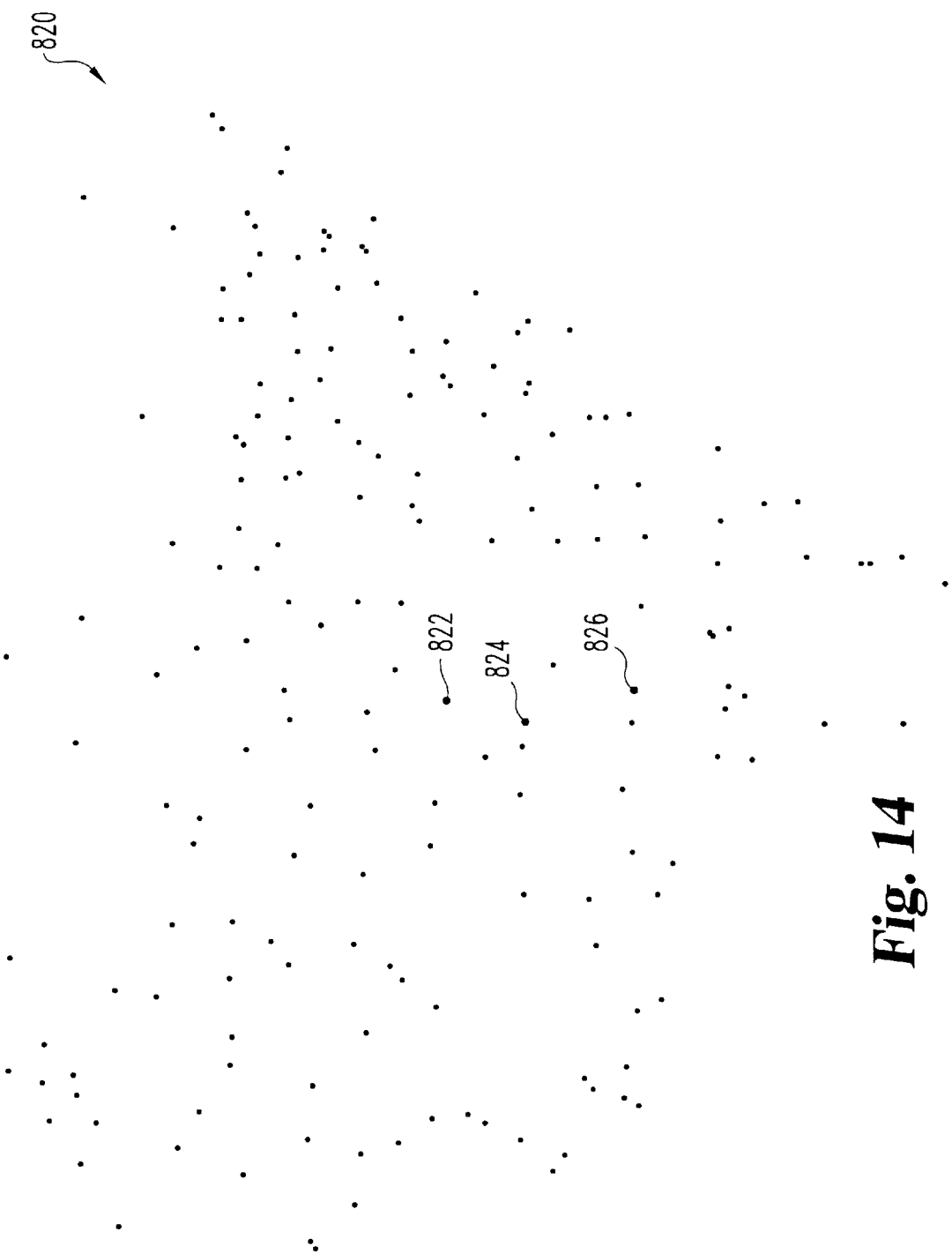
FIGS. 14–17 depict a sequence of four images for another form of animated visualization according to the present invention.
Figure 17:
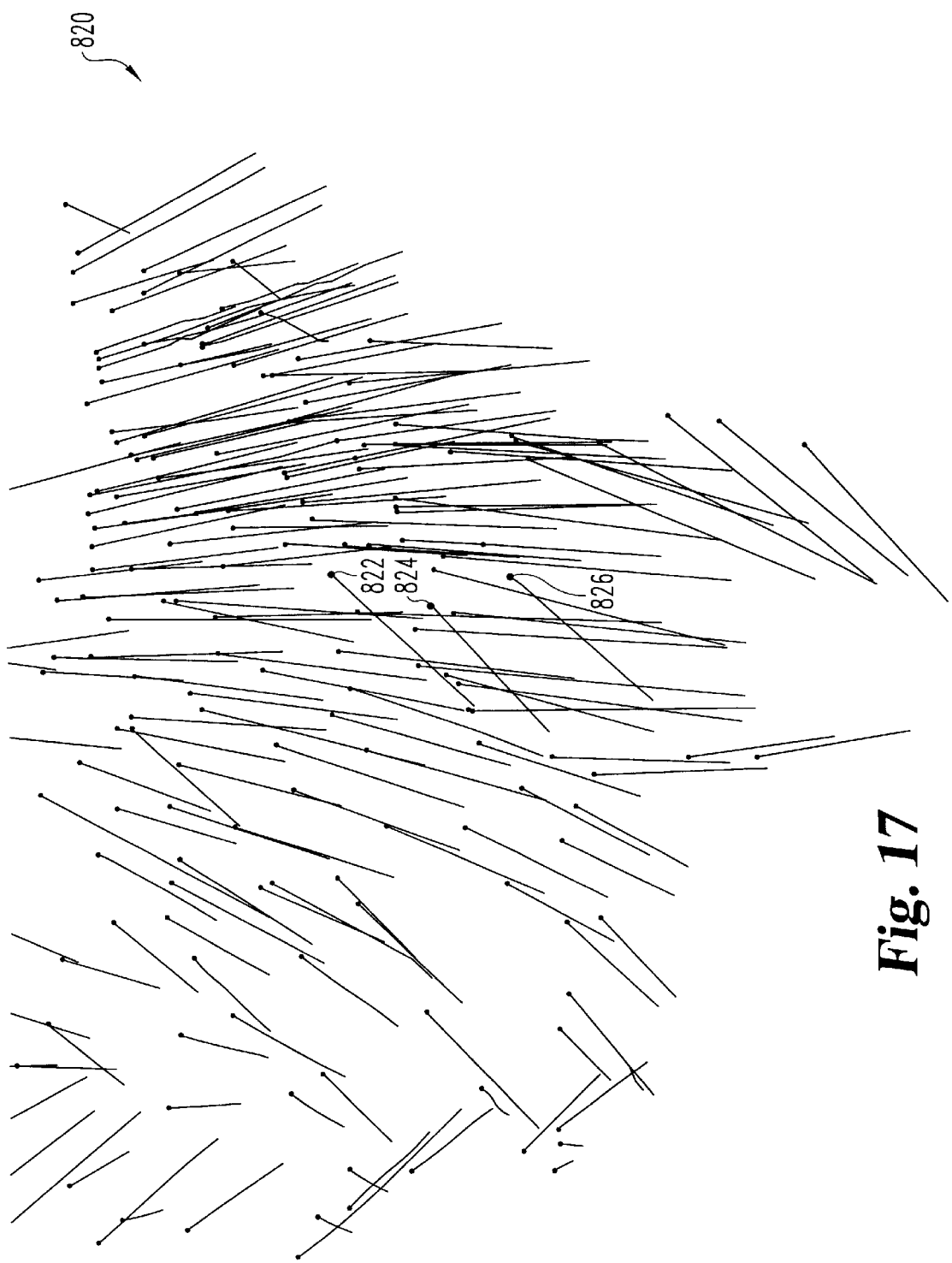

As shown in FIG. 14, city data objects 821 lack any type of motion cue; however, as a comparison to FIGS. 15–17 reveals, motion cues are provided in the form of dynamically changing linear indicators of the type described in connection with FIG. 7. For these linear indicators, respective "origin" locations of the city data objects 821 correspond to city data object position shown in FIG. 14. As the city data objects 821 move in accordance with the closed loop animation pattern 370 of FIG. 7, connection to these locations is maintained by the respective linear indicator. Accordingly, the linear indicators change in size and angular relationship during the animation. It should be appreciated that the indicators visually distinguish the variation of city data objects 822, 824, and 826 as a group relative to surrounding city data objects.

In alternative embodiments, other types of dimensions and variables can be presented using the teachings of the present inventions. Furthermore, the visualization techniques of the present invention can be combined with standard visualization techniques in any manner as would occur to those skilled in the art.

Once generated, a visualization can be viewed by one or more parties interested in the particular knowledge being sought. Examples of applications of a visualization in accordance with the present invention include, but are not limited to merchandise stocking, insurance fraud investigation, bioinformatic data, genomic data, drug performance data, and/or climate prediction. Examination can also include operator input options to: present the visualization on display 26a and/or printer 26b; modify various parameters of the visualization (such as hide one or more patterns, change thresholds, indicators, etc . . . ); review extracted topic information underlying the visualization; and/or store extraction data or visualization information in memory 28. Preferably, these options are provided in a Graphical User Interface (GUI) form. By way of nonlimiting example, a pop-up menu or window can be used to present such options.

Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected.

What is claimed is:

1. A method, comprising:
   establishing a number of visualization objects for display with a computer system to represent data relative to a number of variables;
   selecting a first animation pattern to represent a first one of the variables and a second animation pattern to represent a second one of the variables; and
   animating one or more of the objects with a combination of the first animation pattern and the second animation pattern to visually represent a relationship of the one or more objects to the first one of the variables and the second one of the variables.

2. The method of claim 1, further comprising determining an amount of the first animation pattern relative to the second animation pattern in the combination in accordance with a level of the first one of the variables relative to the second one of the variables for each of the one or more objects.

3. The method of claim 1, wherein the first animation pattern includes a closed loop movement pathway.

4. The method of claim 1, wherein the second animation pattern includes an oscillatory motion pattern along a line segment pathway.

5. The method of claim 1, wherein the first pattern includes a first characteristic to visualize a set of the objects having the first one of the variables in common and a second characteristic to visualize different levels of the first one of the variables among members of the set.

6. The method of claim 1, wherein the computer system includes a graphic display device and said animating includes displaying each of the objects as one or more pixels on the graphic display device.

7. A method, comprising:
displaying several data visualization objects with a computer system to represent data relative to a number of variables;
animating a group of the data visualization objects during said displaying, the data visualization objects of the group each having a relationship to one of the variables in common and each being animated with a first animation characteristic to visualize membership in the group; and
visualizing variation of the one of the variables by providing a second animation characteristic for each respective object in the group, the second animation characteristic varying in correspondence to a value of the one of the variables for the respective object.

8. The method of claim 7, wherein the data visualization objects each correspond to a set of one or more pixels on a graphic display.

9. The method of claim 7, wherein said animating includes moving the data visualization objects in the group along a respective one of a corresponding number of pathways.

10. The method of claim 9, wherein the pathways each define a closed loop, said moving is performed in a common rotational direction, and the animation characteristic corresponds to length of each of the pathways.

11. The method of claim 7, wherein one or more members of the group has a relationship to a different one of the variables and said animating including moving the one or more members of the group in accordance with a combination of a first animation pattern representative of the one of the variables and a second animation pattern representative of the different one of the variables.

12. The method of claim 7, wherein the number of variables is at least four and the one of the variables is of a dependent type and corresponds to a synthetic dimension of the data.

13. A method, comprising:
processing data with a computer system;
displaying a number of objects with the computer system to represent the data relative to a number of variables; and
animating a set of the objects each having a relationship to one of the variables in common by moving each set member along a respective one of a corresponding number of closed loop paths to visualize the set.

14. The method of claim 13, wherein the computer system includes a graphic display, said moving is performed in a common rotational direction, and the objects are each defined by one or more pixels generated with the graphic display.

15. The method of claim 13, wherein the number of variables is at least four, at least one of the variables corresponds to an inherent dimension, and at least another of the variables corresponds to a synthetic dimension of the data.

16. The method of claim 13, wherein said animating further includes associating an animation characteristic with each respective object in the set, the animation characteristic corresponding to a level of the one of the variables for the respective object.

17. The method of claim 16, wherein the animation characteristic corresponds to length of each of the paths, the computer system includes a graphic display, the objects in the set each correspond to a respective one of a number of locations in a visualization generated with the graphic display, and the animation characteristic includes a moving relational indicator positioned between a respective one of the data visualization objects and the respective one of the locations.

18. The method of claim 13, wherein the paths are each at least partially curvilinear.

19. The method of claim 13, wherein the closed loop paths are each sized in proportion to value of the one of the variables.

20. The method of claim 13 wherein said moving is performed in a first rotational direction, and further comprising providing an animation of a group of the objects having another of the variables in common, the objects in the group each having a animated characteristic moving along a path in a second rotational direction opposite the first rotational direction to visualize the group.

21. A method, comprising:
establishing a visualization of data with a computer system, the visualization representing the data relative to a number of variables and including a number of data objects each representing a relationship to one of the variables;
moving each of the objects relative to a respective one of a number of visualization locations; and
providing a number of animated indicators each relating a respective one of the objects to the respective one of the visualization locations.

22. The method of claim 21, wherein said providing includes sweeping a line segment of varying length between the respective one of the objects and the respective one of the visualization locations during said moving.

23. The method of claim 21, wherein the computer system includes a graphic display and said establishing includes defining each of the objects with one or more pixels generated by the graphic display.

24. The method of claim 21, wherein the objects each follow a respective one of a number of curvilinear paths during said moving, the curvilinear paths are each looped, and the objects each travel in a common rotational direction during said moving.

25. The method of claim 24, wherein the animated indicators each including a line segment with a length that varies during said moving and connects the respective one of the objects and the respective one of the visualization locations.

26. The method of claim 21, wherein the length of the line segment for a respective one of the animated indicators corresponds to a nonzero value of the one of the variables for the respective one of the objects.

27. The method of claim 21, wherein the computer system includes a graphic display, the respective one of the objects is defined by a set of one or more pixels generated with the graphic display, a respective one of the locations corresponds to a point along a looped path followed by the respective one of the objects during said moving, and further comprising dynamically connecting the respective one of the objects to the respective one of the locations with a respective one of the animated indicators positioned therebetween when the respective one of the objects is separated from the respective one of the locations during said moving.

28. A system, comprising:
a processor operable to generate an output to provide a visualization of data, the visualization representing the data relative to a number of data dimensions, the output including a number of animation signals corresponding to a set of objects of the visualization, the objects each having one of the data dimensions in common, the animation signals defining a first animation characteristic and a second animation characteristic; and a display device responsive to the output to display the visualization with the objects being animated in accordance with the animation signals, the first animation characteristic visualizing the data objects as a group and the second animation characteristic visualizing variation in the one of the data dimensions among the group when the visualization is displayed.

29. The system of claim 28, further comprising an operator input device to provide a selection signal, said processor being responsive to said selection signal to designate the one of the data dimensions.

30. The system of claim 28, wherein the display device is a color graphic display unit and each of the objects is represented by a set of one or more pixels generated with the graphic display.

31. The system of claim 28, wherein said processor is operable to animate at least one of the objects with a third animation characteristic indicative of another of the data dimensions.

32. An apparatus, comprising a computer-accessible device carrying logic operable to display a first visual object and a second visual object with a computer system, the first object representing data corresponding to a first combination of a number of data dimensions and the second object representing data corresponding to a second combination of the data dimensions, the logic being further operable to move the first object in a first pattern and the second object in a second pattern while being displayed, the first pattern and the second pattern each including a first animation characteristic to represent one of the data dimensions common to the first combination and the second combination and a second animation characteristic indicative of a varying level of the one of the data dimensions.

33. The apparatus of claim 32, wherein the device is in the form of a removable memory and the logic is in the form of a number of programming instructions encoded in the memory.

34. The apparatus of claim 32, wherein the device includes a transmission medium of a computer network to carry the logic in the form of one or more signals.

35. The apparatus of claim 32, wherein the first pattern and second pattern correspond to a first animation pattern type to represent the one of the data dimensions and the logic is further operable to represent a relationship of the first object to another of the data dimensions with a second animation pattern type, the first pattern being a combination of the first animation pattern type and the second animation pattern type.

36. An apparatus, comprising: a computer-accessible device carrying logic executable with a computer system to display several visualization objects, the visualization objects representing data relative to a number of variables, said logic providing a first animation pattern to represent a first one of the variables and a second animation pattern to represent a second one of the variables and being operable to animate one or more of the visualization objects with a combination of the first animation pattern and the second animation pattern to visually represent a relationship of the one or more objects to the first one of the variables and the second one of the variables.

37. The apparatus of claim 36, wherein the device is in the form of a removable memory and the logic is in the form of a number of programming instructions encoded in the memory.

38. The apparatus of claim 36, wherein the device includes a transmission medium of a computer network to carry the logic in the form of one or more signals.

39. The apparatus of claim 36, wherein the first animation pattern has a first characteristic to visualize the objects having a relationship to the first one of the variables as a group and a second characteristic to visualize variation of the first one of the variables among members of the group.

40. A computer system, comprising:
means for processing data;
means for displaying a visualization of the data relative to a number of variables, the visualization including several visual objects; and
means for selecting a first animation pattern to represent a first one of the variables and a second animation pattern to represent a second one of the variables; and
means for animating one or more of the objects with a combination of the first animation pattern and the second animation pattern to visually represent a relationship of the one or more objects to the first one of the variables and the second one of the variables.

* * * * *